(12) United States Patent
Simon et al.

(10) Patent No.: US 12,312,974 B2
(45) Date of Patent: May 27, 2025

(54) TURBINE WITH PRESSURISED CAVITIES

(71) Applicant: SAFRAN AIRCRAFT ENGINES, Paris (FR)

(72) Inventors: Matthieu Simon, Moissy-Cramayel (FR); Ulysse Jacques Bernard Danteny, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 48 days.

(21) Appl. No.: 18/006,536

(22) PCT Filed: Jul. 22, 2021

(86) PCT No.: PCT/FR2021/051374
§ 371 (c)(1),
(2) Date: Jan. 23, 2023

(87) PCT Pub. No.: WO2022/018385
PCT Pub. Date: Jan. 27, 2022

(65) Prior Publication Data
US 2023/0296023 A1    Sep. 21, 2023

(30) Foreign Application Priority Data

Jul. 23, 2020   (FR) .................................. 2007781

(51) Int. Cl.

| | |
|---|---|
| *F01D 5/08* | (2006.01) |
| *F01D 1/26* | (2006.01) |
| *F01D 11/04* | (2006.01) |
| *F01D 11/24* | (2006.01) |
| *F01D 25/12* | (2006.01) |
| *F01D 25/24* | (2006.01) |
| *F02C 6/08* | (2006.01) |
| *F02C 7/18* | (2006.01) |
| *F02K 3/06* | (2006.01) |

(52) U.S. Cl.
CPC ................ *F01D 5/08* (2013.01); *F01D 1/26* (2013.01); *F01D 25/12* (2013.01); *F05D 2250/44* (2013.01)

(58) Field of Classification Search
CPC .......... F01D 11/24; F01D 25/14; F01D 25/12; F01D 1/26; F01D 25/246; F01D 1/24;
(Continued)

(56) References Cited

U.S. PATENT DOCUMENTS 4,752,185 A * 6/1988 Butler ..................... F01D 11/10
415/175
4,841,726 A * 6/1989 Burkhardt ................. F02C 7/18
415/116

(Continued)

FOREIGN PATENT DOCUMENTS

| EP | 2189624 A2 | 5/2010 |
|---|---|---|
| FR | 2 938 293 A1 | 5/2010 |
| FR | 3 021 700 A1 | 12/2015 |

OTHER PUBLICATIONS

France Search Report and Written Opinion mailed Apr. 19, 2021, issued in Application No. FR2007781, filed Jul. 23 2020, 8 pages.
(Continued)

*Primary Examiner* — Eric J Zamora Alvarez
(74) *Attorney, Agent, or Firm* — CHRISTENSEN O'CONNOR JOHNSON KINDNESS PLLC

(57) ABSTRACT

A turbine has a first rotor and a second rotor configured to pivot about a longitudinal axis (X) according to two opposite directions of rotation. The first rotor has a radially outer drum from which blades extend radially inwards. The first rotor and the second rotor are surrounded by a stator annular part. The stator annular part delimits, with the drum, at least one upstream annular cavity and one downstream annular cavity separated from each other by sealing means.

11 Claims, 6 Drawing Sheets

(58) Field of Classification Search
CPC . F01D 5/03; F01D 5/081; F01D 25/24; F01D 5/084; F01D 11/00; F01D 11/003; F01D 11/08; F01D 11/04; F01D 5/06; F01D 11/006; F01D 25/08; F01D 25/243; F01D 5/14; F01D 5/34; F01D 7/00; F01D 11/001; F01D 11/20; F01D 17/145; F01D 25/28; F01D 5/08; F01D 5/225; F01D 9/023; F01D 9/04; F01D 9/042; F01D 9/06; F01D 9/065; F02C 6/08; F02C 3/067; F02C 7/18; F05D 2260/201; F05D 2260/20; F05D 2240/24; F05D 2220/323; F05D 2250/44; F05D 2260/205; F05D 2240/55; F05D 2220/32; F05D 2240/30; F05D 2240/11; F02K 3/072; F02K 3/06; Y02T 50/60

See application file for complete search history.

(56) References Cited

U.S. PATENT DOCUMENTS

| | | | | |
|---|---|---|---|---|
| 5,152,666 | A * | 10/1992 | Stripinis | F02C 7/18 415/178 |
| 5,351,732 | A * | 10/1994 | Mills | F01D 11/24 415/177 |
| 5,984,314 | A * | 11/1999 | Peters | F01D 11/02 277/412 |
| 6,149,074 | A * | 11/2000 | Friedel | F01D 11/24 165/169 |
| 6,227,800 | B1 * | 5/2001 | Spring | F02C 7/18 60/39.83 |
| 9,759,092 | B2 * | 9/2017 | Moreton | F01D 9/00 |
| 10,302,015 | B2 * | 5/2019 | Ribarov | F02C 7/14 |
| 10,612,466 | B2 * | 4/2020 | Eastwood | B64D 33/02 |
| 10,738,791 | B2 * | 8/2020 | Moniz | F04D 29/321 |
| 2019/0153963 | A1 * | 5/2019 | Kitaguchi | F02C 7/26 |
| 2019/0218913 | A1 * | 7/2019 | Sen | F01D 1/26 |
| 2019/0390569 | A1 * | 12/2019 | Bunel | F01D 11/24 |

OTHER PUBLICATIONS

International Search Report mailed Nov. 5, 2021, issued in corresponding International Application No. PCT/FR2021/051374, filed Jul. 22, 2021, 5 pages.

Written Opinion mailed Nov. 5, 2021, issued in corresponding International Application No. PCT/FR2021/051374, filed Jul. 22, 2021, 7 pages.

* cited by examiner

TURBINE WITH PRESSURISED CAVITIES

BACKGROUND

Embodiments of the present disclosure relate to a cooling device in a turbine of a turbine engine, for example a turbofan.

FIG. 1 shows a dual-flow, dual-body turbomachine 1. The axis of the turbine engine is referenced X and corresponds to the axis of rotation of the rotating portions. Next, the terms axial and radial are defined with respect to the axis X.

The turbine engine 1 includes, from upstream to downstream in the gas flow direction, a fan 2, a low-pressure compressor 3, a high-pressure compressor 4, a combustion chamber 5, a high-pressure turbine 6 and a low-pressure turbine 7.

The air coming from the fan 2 is split into a primary flow 8 flowing in an annular primary flow path 9, and a secondary flow 10 flowing in an annular secondary flow path 11 surrounding the annular primary flow path 10.

The low-pressure compressor 3, the high-pressure compressor 4, the combustion chamber 5, the high-pressure turbine 6 and the low-pressure turbine 7 are arranged in the primary flow path 9.

The rotor of the high-pressure turbine 6 and the rotor of the high-pressure compressor 4 are rotatably coupled via a first shaft 12 so as to form a high-pressure spool.

The rotor of the low-pressure turbine 7 and the rotor of the low-pressure compressor 3 are rotatably coupled via a second shaft 13 so as to form a low-pressure spool, the fan 2 being able to be connected directly to the rotor of the low-pressure compressor 3 or via an epicyclic gear train for example.

As best shown in FIG. 2, the low-pressure turbine 7 includes in particular different successive stages including movable wheels 14 and fixed portions. The movable wheel includes a disc 15 at which blades 16 are mounted. The ends of the blades 16 are surrounded by a fixed ring 17 made of an abradable material, the ring 17 being fastened to the casing 18 of the turbine. Distributors 19 are located downstream of the movable wheels 14. The distributors 19 and the rings 17 are mounted on the casing via flanges or hooks 20 extending from the radially inner surface of the casing 18.

In order to guarantee high efficiency of the turbine engine, the air flow that does not pass through the movable wheels 14 of the different stages should be limited, i.e. the leaks between the radially outer ends of the blades 16 and the ring 17 made of an abradable material should be limited. For this purpose, the clearance at this interface should be controlled, this clearance being dependent of the temperature of the casing 18, and in particular of the areas of the casing 18 including the hooks or flanges 20 supporting the ring 17.

The primary air flow coming from the combustion chamber 5 has a high temperature and heats up the portions located downstream, such as the fixed and movable portions of the turbine 6, 7.

In order to control the aforementioned clearance and to avoid any premature degradation of the different fixed and movable portions of the turbine, it is necessary to provide for effective cooling means that can be easily integrated into the environment of the turbine engine.

The patent application FR 3 021 700, in the name of the Applicant, discloses a device 21 for cooling a casing 18 of a low-pressure turbine 7, visible in FIG. 3, including manifold housings 22 fastened on a fixed casing of the turbine engine, each manifold housing 22 forming a channel extending axially.

In addition, the device 21 includes tubes 23, also called rails, extending circumferentially on either side of the manifold housings 22. Each tube 23 includes an air inlet opening into the channel of the manifold housing 22 and air ejection orifices directed towards the casing 18, so that cooling air can enter the manifold housings 22 then into the tubes 23 before coming out through the orifices opposite the casing 18, so as to cool it. This is referred to in particular as cooling by impact since the air is brought to impact the casing 18. Such a device is known as LPTACC (standing for "Low-Pressure Turbine Active Clearance Control").

Recent developments have led to the development of so-called contra-rotating turbines.

Such a turbine includes a first rotor including one or more stage(s) formed by bladed wheels, rotating about the axis X of the turbine engine in a first direction of rotation, and a second rotor including one or more stage(s) formed by bladed wheels, rotating about the axis X in a second direction of rotation, opposite to the first direction of rotation.

The first rotor includes a radially outer drum, from which blades extend radially inwards. The second rotor includes a radially inner drum, from which blades extend radially outwards.

Cooling of the rotors, in particular of the radially outer drum of the first rotor, should be ensured.

It turns out that it is not relevant to use an LPTACC type cooling device as described hereinabove. Indeed, the use of fixed rails to cool a rotating drum by impact is not effective because, when the drum rotates, a boundary air layer surrounds the drum, the air flow coming from the orifices of the rails being sheared by the rotation of the drum and by the boundary layer, thereby considerably reducing the cooling efficiency.

In the current technique, the radially outer drum delimits with an outer annular casing an annular space supplied with cooling air by air drawn in the high-pressure compressor, which reduces the efficiency of the compressor. Moreover, a high piston effect exists because at the downstream end of the first rotor, there is a pressure difference equivalent to the total expansion of the turbine.

SUMMARY

The present document relates to a turbine comprising a first rotor and a second rotor able to pivot about a longitudinal axis according to two opposite directions of rotation, the first rotor including a radially outer drum from which blades extend radially inwards, the first rotor and the second rotor being surrounded by a stator annular part, characterised in that the stator annular part delimits with the drum at least one upstream annular cavity and one downstream annular cavity separated from each other by sealing means, the upstream annular cavity being connected to first means for supplying cooling air at a first pressure and the downstream annular cavity being connected to second means for supplying cooling air at a second pressure lower than the first pressure.

In this manner, the upstream annular cavity is supplied with cold air via air at high pressure in order to be able to purge the upstream annular cavity and also to pressurise it. This allows avoiding hot air from the flow path flowing outwards of the drum. Since a high-pressure air supply penalises the efficiency of a turbine engine since it is generally drawn in a compressor, the aim is to provide the minimum and therefore to pressurise an annular cavity with a small volume.

The downstream annular cavity is supplied with cooling air with air having a lower pressure, this air turning out to be much less penalising on the efficiency of the turbine engine. This cooling air is inexpensive and can be used in large mounts. However, the low supply pressure of this cooling air does not allow purging the entire annular space, i.e. the upstream annular cavity and the downstream annular cavity, which explains the separation of the two cavities by sealing means. Downstream of the outer drum, the air is expanded and the slightly pressurised air coming from the secondary flow path can still join the primary flow path.

The upstream annular cavity may be an annular cavity formed at the upstream end of the turbine. This upstream annular cavity surrounds the upstream end of the radially outer drum.

The separation of the two annular cavities by sealing means allows limiting the "piston" effect on the turbine. Positioning sealing means immediately downstream of the annular row of blades of the first rotor achieves the best trade-off between limiting the piston effect and purging the upstream annular cavity with air at high pressure.

According to another feature, the first cooling air supply means have a first temperature lower than a second temperature of the second air supply means.

The upstream annular cavity may fluidly communicate with an annular air flow path inside which the blades extend, the annular flow path being delimited radially outwards by the drum of the first rotor and being delimited radially inwards by a radially inner drum of the second rotor.

The downstream annular cavity may fluidly communicate with the annular air flow path inside which the blades extend.

The upstream end of the drum may delimit with the stator annular part a first annular air passage with an annular air flow path inside which the blades extend.

The downstream end of the drum of the first rotor may delimit with the stator annular part a second annular passage with an annular air flow path inside which the blades extend.

At least one annular housing may be formed at the junction of at least one blade of the first rotor with the drum of the first rotor.

A first annular housing may fluidly communicate with the upstream annular cavity. The first housing may be arranged radially opposite the upstream annular cavity.

The first annular housing may be formed at the blade arranged at the upstream end of the drum of the first rotor. The first housing may fluidly communicate with an annular air flow path in which the blades extend radially.

A second annular housing may be arranged radially opposite the downstream annular cavity. The second housing(s) may be closed, i.e. be hermetic with respect to the air of the primary flow path and the air of the downstream annular cavity.

The first and/or second air supply means may comprise means for controlling opening/closure of the air supply.

The control means may comprise an air flow rate control valve, which air flow rate may be drawn in an annular secondary air flow path. In this manner, it is possible to achieve an active control of the clearances of the turbine in operation. Controlling a high cold air flow rate in the downstream annular cavity, during the cruising phase, will allow reducing the air temperature felt by the outer annular drum and therefore by the outer rotor through a reduction in the average temperature by enthalpy balance since more cold air flow rate is added from the second cooling air supply means than a relatively hotter air flow rate from the first supply means for supplying cooling air, coming from the upstream annular cavity, and passing at the sealing means. The first stage of the turbine, which does not benefit from this cooling because of partitioning by the sealing means, will still have its temperature decrease and therefore its radial clearances close, via the phenomenon of conduction in the stator annular part from downstream to upstream. Hence, there is a passive control at the clearance(s) of the stages arranged radially at the upstream annular air cavity and an active control of the clearances of the downstream stages arranged radially at the downstream annular cavity, when only the second air supply means are connected to means for controlling the air flow rate.

The drum of the first rotor may be frustoconical with a section increasing downstream.

The present document also relates to a turbine engine, such as an airplane turboprop engine or turbojet engine, including at least one turbine as described hereinabove.

The turbine engine may be such that the first cooling air supply means are connected, at an upstream side, to first means for drawing air from a compressor, preferably a high-pressure compressor, and/or wherein the second cooling air supply means are connected, at an upstream side, to second means for drawing air from an annular secondary air flow path of the turbine engine which is a turbofan with a primary air flow and the secondary air flow coaxial and external to the primary air flow. The annular secondary air flow path extends radially outwards of the stator annular part.

It should be understood that the air coming from the compressor supplies only the upstream annular cavity and/or that the air of the secondary annular air flow path supplies only the downstream annular cavity. Since the air of the secondary flow path is cold, it is not necessary to impart air cooling at the ends of the blades arranged in line with the downstream annular cavity.

The annular secondary air flow path herein refers to the annular air flow path surrounding the annular primary air flow path and which is well-known in the prior art relating to turbofans. Thus, the turbine engine comprises a fan which blows air in an annular primary flow path and in an annular secondary flow path. The blades of the turbine according to the present document extend into the primary flow path and the air for the downstream cavity is drawn from the secondary flow path.

In another embodiment, the turbine may comprise three successive annular cavities along the longitudinal axis of the turbine, an upstream annular cavity, an intermediate annular cavity and a downstream annular cavity, the cavities being separated by sealing means.

The intermediate annular cavity may be connected to third cooling air supply means, this air may be air coming from the compressor, preferably from the high-pressure portion of the compressor, and from an area for drawing air in the compressor located upstream of the air drawing area connected to the first air supply means. This allows having the most compressed purge air and allows avoiding the air from the flow path flowing into the cavities outside the drum of the first rotor.

At least one third annular housing can fluidly communicate with the intermediate annular cavity. The third annular housing may be arranged radially opposite the intermediate annular cavity and it can fluidly communicate with the annular primary air flow path.

The stator annular part may be a casing of the turbine which may be a low-pressure turbine of a turbine engine which may be a turbofan.

The upstream end of the casing of the turbine may be connected to an intermediate casing interposed between a casing of an upstream high-pressure turbine and the casing of the low-pressure turbine. This intermediate casing may comprise substantially radial stationary blades connecting an inner annular shroud and an outer annular shroud.

The downstream end of the casing of the turbine may be connected to an exhaust casing which may comprise an inner annular shroud and an outer annular shroud connected to each other by substantially radial stationary blades.

The casing of the low-pressure turbine may be connected to the outer annular shroud of the intermediate casing and for example to its downstream end and/or to the outer annular shroud of the exhaust casing and for example to its upstream end.

DETAILED DESCRIPTION

Figure 1:
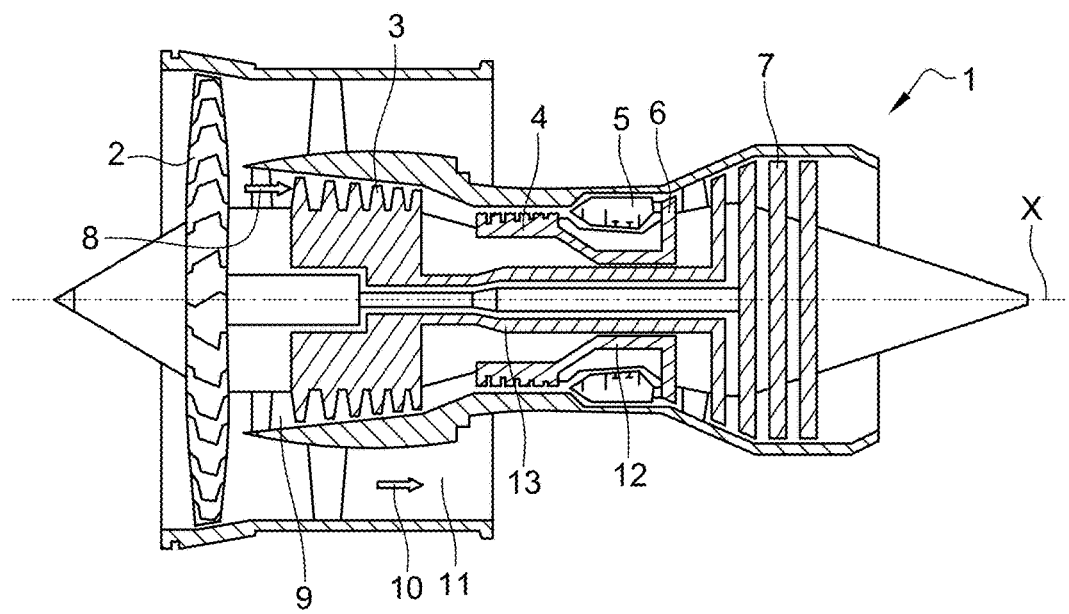
FIG. 1, already described before, is a schematic view in axial section of a turbine engine of the prior art, FIG. 2, already described before, is a half-view in axial section of a turbine of the prior art, FIG. 3, already described before, is a perspective view of a cooling device of the prior art.
Figure 2:
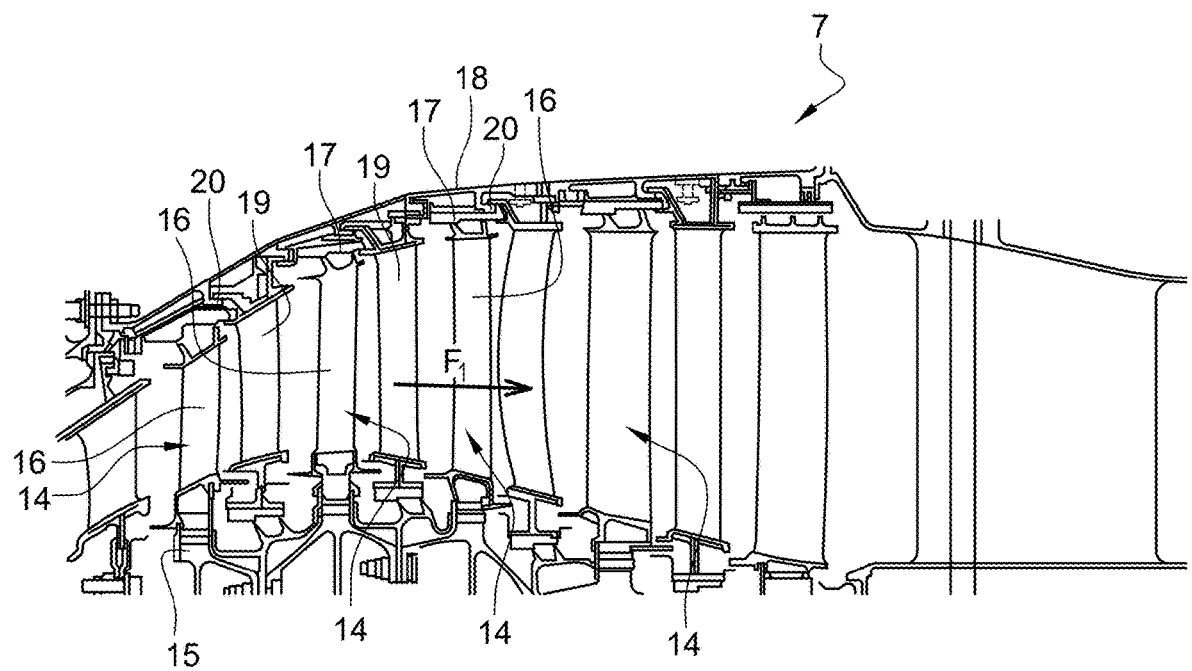
Figure 3:
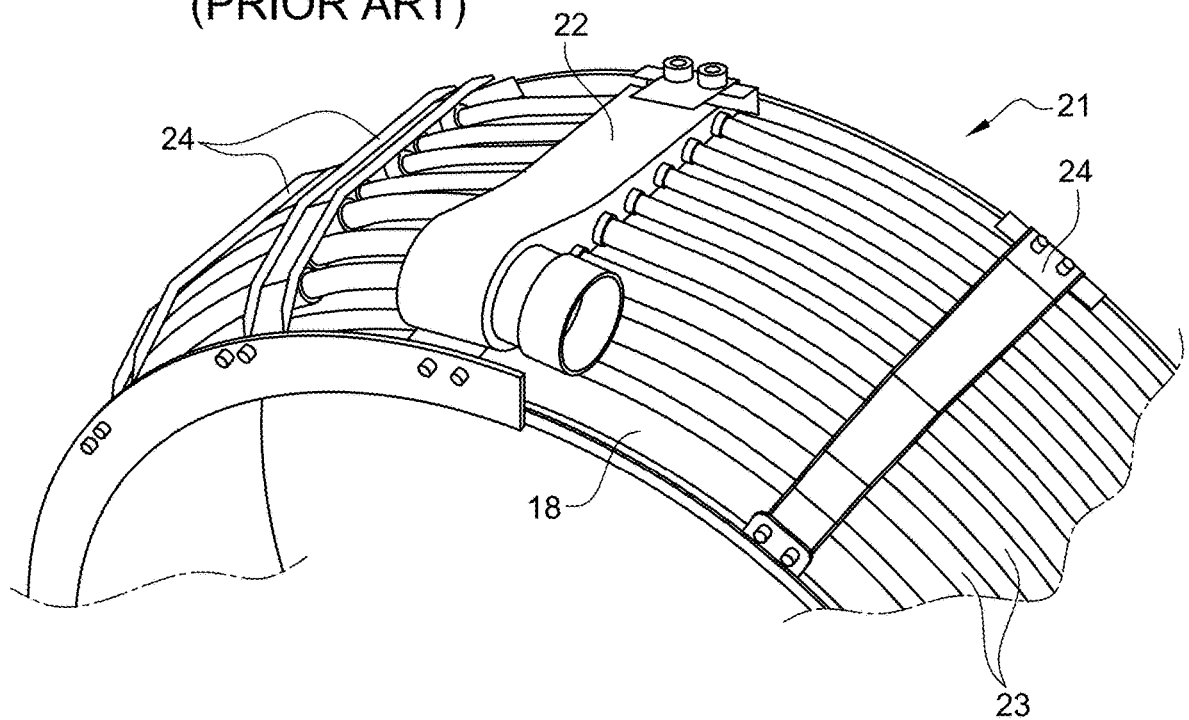
Figure 4:
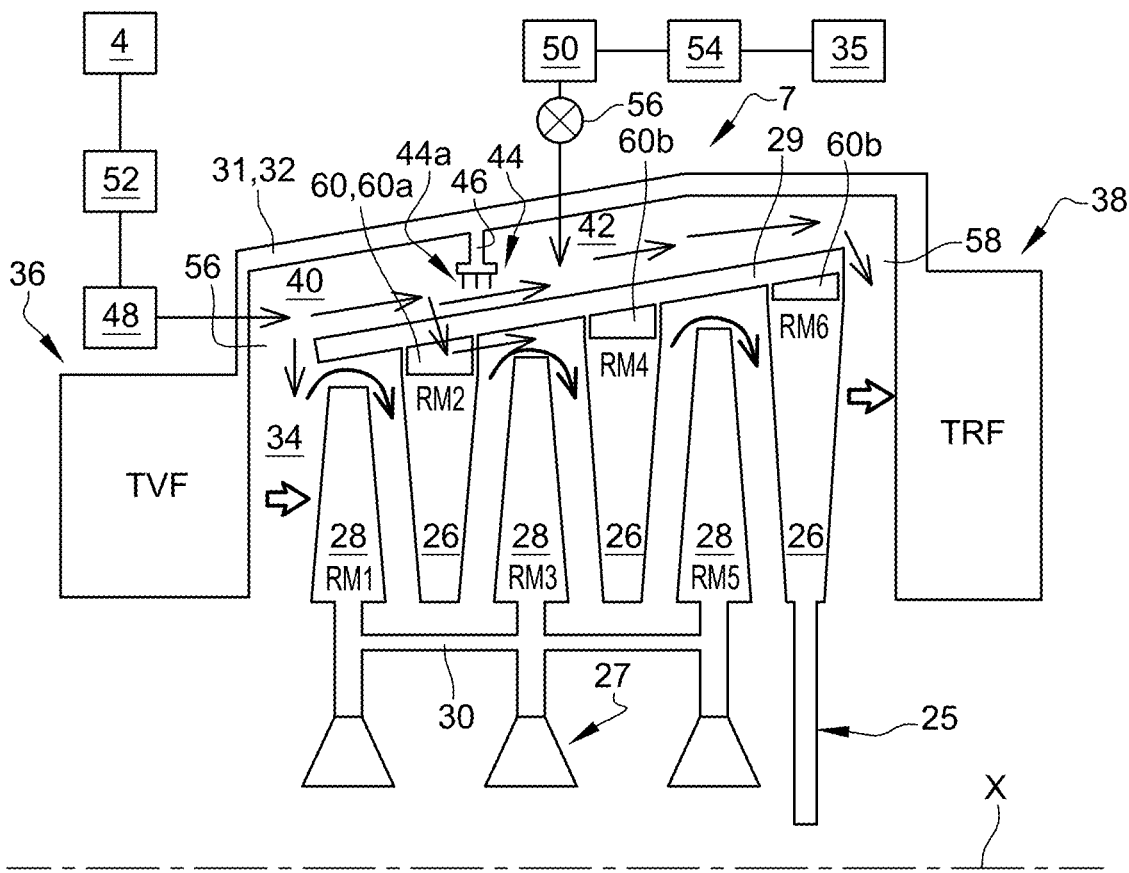
FIG. 4, illustrates an embodiment of a turbine according to the present disclosure.
Figure 5:
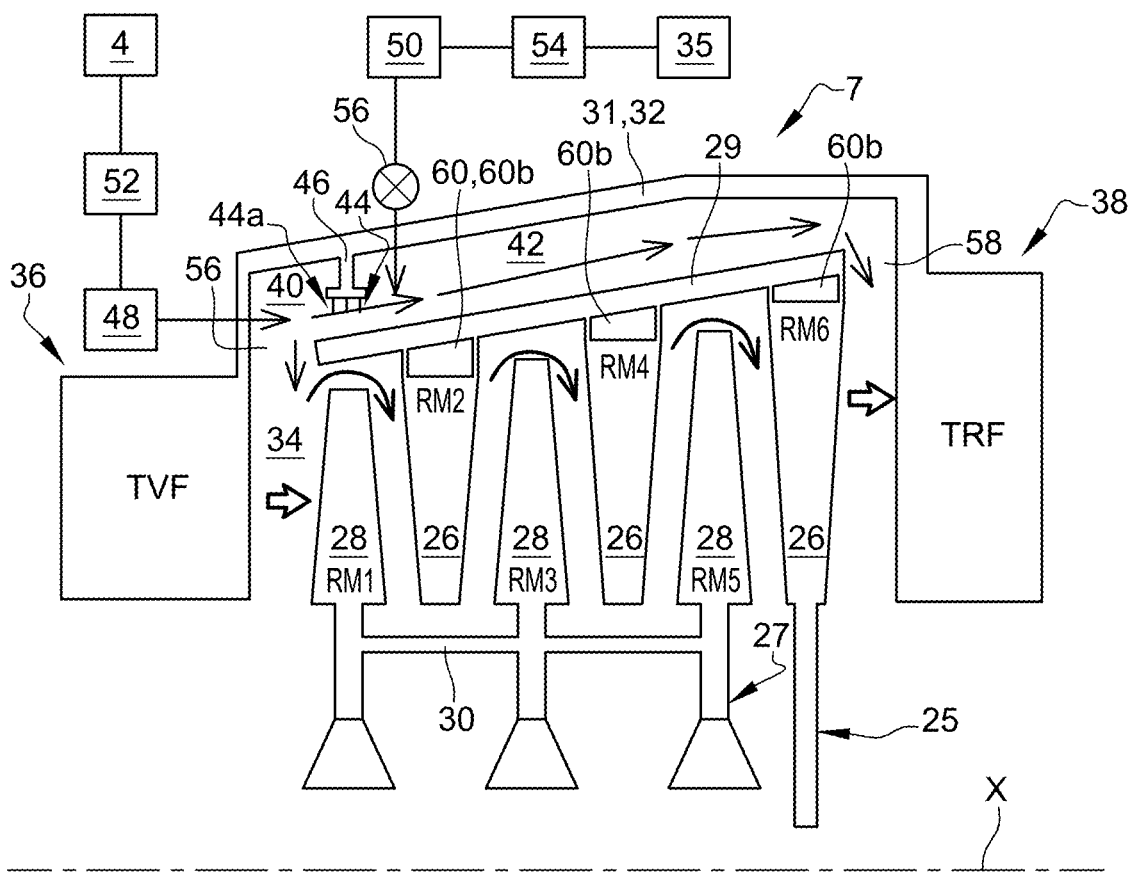
FIG. 5, illustrates another embodiment of a turbine according to the present disclosure.
Figure 6:
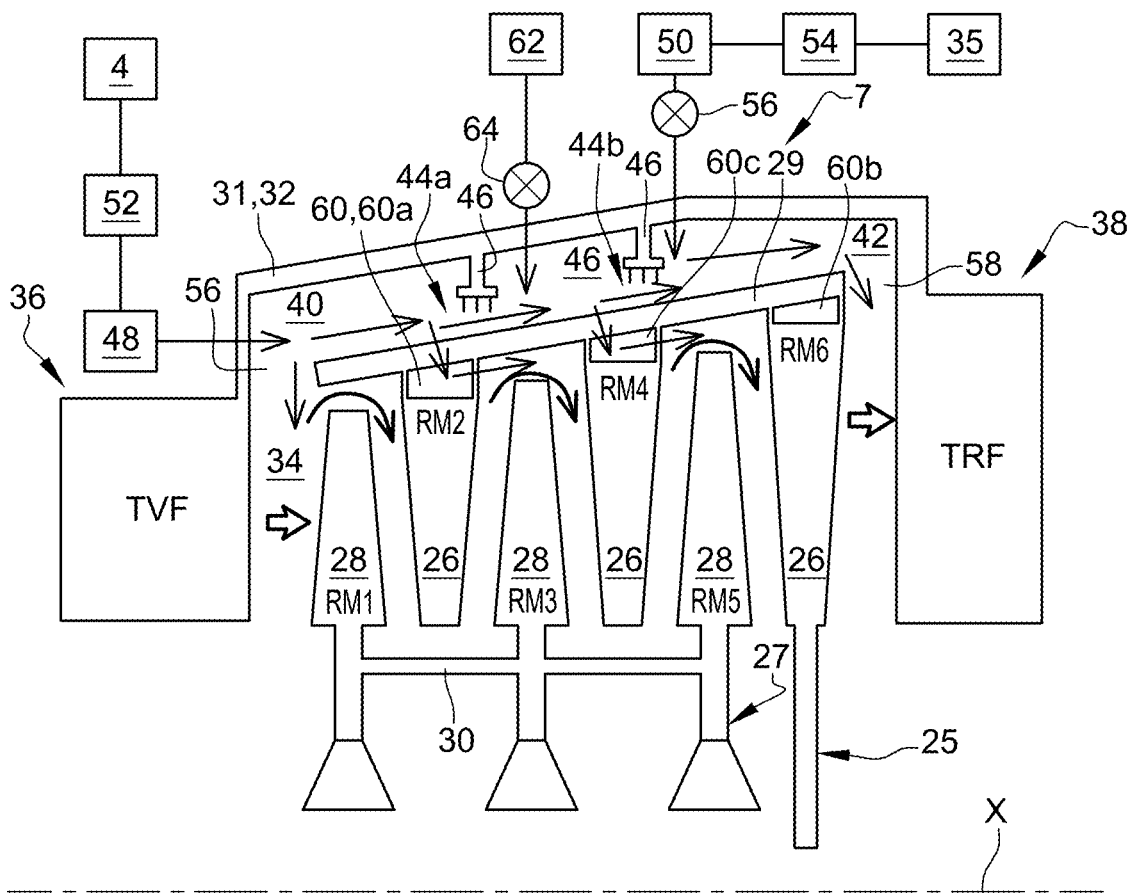
FIG. 6, illustrates another embodiment of a turbine according to the present disclosure.

FIGS. 4 to 6 illustrate a low-pressure turbine 7 of a turbine engine in accordance with four possible embodiments.

The turbine 7 is of the contra-rotating type and includes a first rotor 25 including one or more stage(s) formed by bladed wheels 26, rotating about the longitudinal axis X of the turbine 7 in a first direction of rotation, and a second rotor 27 including one or more stage(s) formed by bladed wheels 28, rotating about the axis X in a second direction of rotation, opposite to the first direction of rotation.

The first rotor 25 includes a radially outer drum 29, from which blades 26 extend radially inwards. The second rotor 27 includes a radially inner drum 30, from which blades 28 extend radially outwards.

The first and second rotors 25, 27 are housed in a stator annular part or fixed casing 31, the casing 31 including in particular a radially outer annular wall 32. The blades 26, 28 extend into an annular primary air flow path 34. The radially outer drum 29 has a frustoconical shape with a section increasing downstream. The upstream end of the radially outer annular wall 32 of the outer casing 31 is connected to the downstream end of an intermediate casing 36 interposed between the low-pressure turbine and a high-pressure turbine (not represented). The downstream end of the radially outer annular wall 32 of the outer casing 31 is connected to the upstream end of an exhaust casing 38.

As indicated before, cooling of the rotors 25, 27, in particular of the radially outer drum 29 of the first rotor 25, should be ensured.

In the different embodiments, the radially outer drum 29 delimits with the radially outer annular wall 32 an upstream annular cavity 40 and a downstream annular cavity 42 which are separated from each other by sealing means 44. The upstream annular cavity 40 is formed at the upstream end of the turbine. This upstream annular cavity 40 surrounds the upstream end of the radially outer drum 29.

In the embodiments of FIGS. 4 and 5, only an upstream annular cavity 40 and a downstream annular cavity 42 are present, while in the embodiments of FIGS. 5 and 6, an intermediate annular cavity 46 is formed longitudinally between the upstream annular cavity 40 and the downstream annular cavity 42 and sealing means 44 separate the intermediate annular cavity 46 from the upstream annular cavity 40 and from the downstream annular cavity 42.

Although not represented in the figures, it would be possible to have more than three successive annular cavities.

The sealing means 44 comprise annular wipers 44a formed at the radially inner end of a radial annular wall 46 of the casing 31, this radial annular wall 46 being connected at its radially outer end to the radially outer annular wall 32. The wipers 44a cooperate with the radially outer drum 29 in order to ensure sealing against the circulation of air.

The upstream annular cavity 40 connected to first means 48 for supplying cooling air at a first pressure and at a first temperature and the downstream annular cavity is connected to second means 50 for supplying cooling air at a second pressure lower than the first pressure and having a second temperature lower than the first temperature.

In the particular example of the low-pressure turbine, the first cooling air supply means 48 are connected, at an upstream side, to first means 52 for drawing air from a compressor 4, for example a high-pressure compressor, and the second cooling air supply means 50 are connected, at an upstream side, to second means 54 for drawing air from an annular secondary air flow path 35 of a turbofan. Thus, the air supplying the upstream annular cavity 40 is at a pressure and a temperature respectively higher than the pressure and the temperature of the air supplying the downstream annular cavity 42.

The second air supply means 50 may comprise means 56 for controlling opening/closure of the air supply of the downstream annular cavity 42. For example, the control means 50 may comprise an air flow rate control valve. The first air supply means 48 may be deprived of any control means, the air flow rate entering the upstream annular cavity 40 not being regulated.

The upstream end of the radially outer drum 29 delimits with the outer casing 31 a first annular air passage 56 with the annular primary air flow path 34 inside which the blades 26, 28 extend. The downstream end of the radially outer drum 29 delimits with the outer casing 31 a second annular air passage 58 with the annular primary air flow path 34 inside which the blades 26, 28 extend.

Annular housings 60 may be formed at the junction of at least one blade 26 of the first rotor 29 with the radially outer drum 29. In practice, it is observed in the embodiments that each blade 26 comprises such a housing 60.

In the embodiment of FIG. 4, a first housing 60a is formed at the blade of the upstream end of the first rotor 25. This first housing 60a communicates with the annular primary air flow path 34 by means of an orifice opening downstream and communicates with the upstream annular cavity 40. This first annular housing 60a is arranged radially at the upstream annular cavity 40. Each annular row of blades 26 arranged radially opposite the downstream annular cavity 42 comprises a second annular housing 60b which is hermetic with respect to the downstream annular cavity 42 and the primary annular flow path 34, these second housings 60b being unable to receive air.

The arrival of cold air in the downstream annular cavity 42, can allow reducing the air temperature as felt by the outer annular drum 29 and therefore by the outer rotor through a reduction in the average temperature by enthalpy balance since more cold air flow rate from the second cooling air supply means 50 is added than relatively hotter air flow rate from the first cooling air supply means 48, coming from the upstream annular cavity 40, and passing at the sealing means 44. The first stage of the turbine, which does not benefit from this cooling due to partitioning by the sealing means 44, will nevertheless have its temperature decrease and therefore its radial clearances close, via the phenomenon of conduction in the stator annular part 31 from downstream to upstream.

In this embodiment, it is observed that the cooling air of the upstream annular cavity 40 circulates in the first annular housing 60a then flows in the flow path 34 allowing cooling the upstream annular row of blades 26 and that 26 arranged immediately in downstream as illustrated in FIG. 4. Hence, there is a cascade cooling.

In the embodiment of FIG. 5, the sealing means 44 are arranged radially outwards of the first annular row of movable blades of the second rotor. The presence of second hermetic annular housings 60b is observed but there is no first annular housing. The air entering the upstream annular cavity 40 flows directly through the first annular passage 56 and allows pressurising the upstream annular cavity 40. The cascade cooling mentioned with reference to FIG. 4 does not exist in this embodiment. This configuration allows minimising the flow rate of air drawn in the compressor. This solution is effective in the case of temperatures of the primary flow path 34 that are quite cold and which does not impose a need for cooling the outer rotor 25. The air in the upstream cavity achieves a purge to avoid the air from the primary flow path flowing radially above the outer drum whereas the air in the downstream cavity at a lower pressure is actually intended to cool the outer drum.

FIG. 6 corresponds to the embodiment of FIG. 4 in which the downstream annular cavity 42 has been separated into an intermediate annular cavity 46 and a new downstream annular cavity 42. First sealing means 44a separate the upstream 40 and intermediate 46 annular cavities and second sealing means 44b separate the intermediate 46 and downstream 42 cavities, these sealing means 44a, 44b possibly being identical to what has been described before with reference to FIGS. 4 and 5.

The intermediate annular cavity 46 is connected to third cooling air supply means 62, this air may herein be air coming from the compressor, for example the high-pressure compressor, and from an air drawing area in the compressor located upstream of the air drawing area connected to the first air supply means 48. In this manner, the drawn air is at a third pressure and a third temperature lower than the pressure and temperature of the first air supply means 48 but higher than the pressure and temperature of the second air supply means 50. A first housing 60a is formed at the blade 26 of the upstream end of the first rotor 25. This first housing 60a fluidly communicates with the annular primary air flow path 34 by means of an orifice opening out downstream and fluidly communicates with the upstream annular cavity 40. This first annular housing 60a is arranged radially at the upstream annular cavity 40. The annular row of blades 26 arranged radially inwards of the intermediate annular cavity 46 comprises a third annular housing 60c which fluidly communicates with the intermediate annular cavity 46 and with the annular primary air flow path 34. The annular row of blades 26 arranged radially inwards of the downstream annular cavity 42 comprises a second annular housing 60b which is hermetic and communicates neither with the annular primary air flow path 34 nor with the downstream annular cavity 42.

Figure 7:
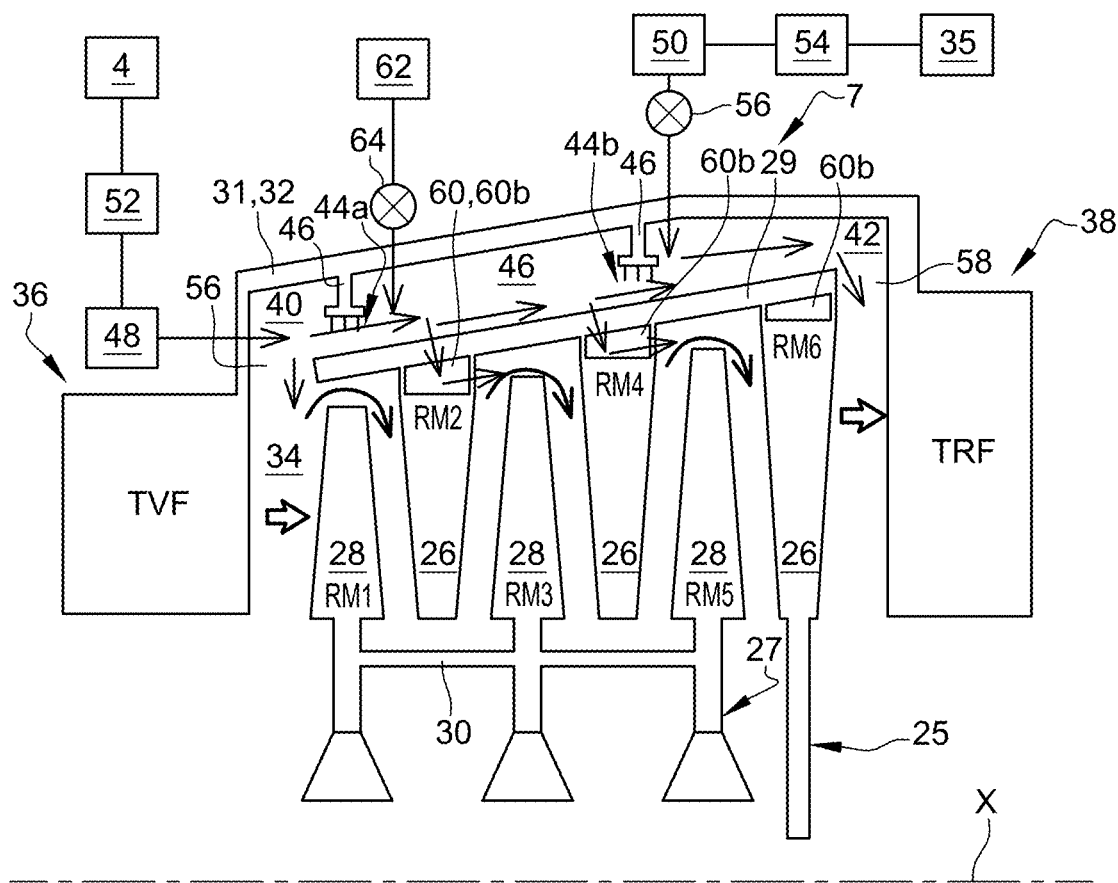
FIG. 7 illustrates another embodiment of a turbine according to the present disclosure.

The embodiment of FIG. 7 corresponds to the embodiment of FIG. 5 in which the downstream annular cavity 42 has been separated into an intermediate annular cavity 46 and a new downstream annular cavity 42. It still corresponds to the embodiment of FIG. 6 in which the first sealing means 44a have been moved upstream and radially outwards of the annular row of blades of the upstream end of the second rotor 27. For the rest, the description made with reference to FIG. 6 also applies to this figure.

In both embodiments of FIGS. 6 and 7, the third cooling air supply means 62 may comprise means 64 for controlling opening/closure of the air supply of the downstream annular cavity 42. For example, the control means 64 may comprise an air flow rate control valve.

The last two multi-cavity configurations allow best fitting the needs in terms of cooling flow rate and associated pressure according to the expansion in the primary air flow path.

The invention claimed is:

1. A turbine engine comprising a turbine comprising a first rotor and a second rotor configured to pivot about a longitudinal axis (X) according to two opposite directions of rotation, the first rotor including a radially outer drum from which blades extend radially inwards, the first rotor and the second rotor being surrounded by a stator annular part, wherein said stator annular part delimits with the radially outer drum at least one upstream annular cavity and one downstream annular cavity separated from each other by sealing means, the upstream annular cavity being connected to a first cooling air supply at a first pressure and the downstream annular cavity being connected to a second cooling air supply at a second pressure lower than the first pressure, the first cooling air supply being connected, at an upstream end, to a compressor and configured for drawing air from the compressor and/or wherein the second cooling air supply is connected, at an upstream end, to an annular secondary air flow path which extends radially outwards of said stator annular part, the second cooling air supply being configured for drawing air from the annular secondary air flow path.

2. The turbine engine according to claim 1, wherein the upstream annular cavity fluidly communicates with an annular air flow path inside which the blades extend, the annular flow path being delimited radially outwards by the drum of the first rotor and being delimited radially inwards by a radially inner drum of the second rotor.

3. The turbine engine according to claim 2, wherein an upstream end of the drum of the first rotor delimits with the stator annular part a first annular air passage with the annular air flow path inside which the blades extend.

4. The turbine engine according to claim 2, wherein the downstream annular cavity fluidly communicates with the annular air flow path inside which the blades extend.

5. The turbine engine according to claim 4, wherein a downstream end of the drum of the first rotor delimits with the stator annular part a second annular air passage with the annular air flow path inside which the blades extend.

6. The turbine engine according to claim 1, wherein at least one annular housing is formed at a junction of at least one blade of the first rotor with the drum of the first rotor.

7. The turbine engine according to claim 6, wherein a first annular housing fluidly communicates with the upstream annular cavity.

8. The turbine engine according to claim 7, wherein the first annular housing is formed at a blade arranged at an upstream end of the drum of the first rotor.

9. The turbine engine according to claim 6, wherein a second annular housing is arranged radially facing the downstream annular cavity.

10. The turbine engine according to claim 1, wherein the second cooling air supply comprises means for controlling an air flow rate from the second cooling air supply to the downstream annular cavity.

11. The turbine engine according to claim 1, wherein the drum of the first rotor is frustoconical with a section increasing downstream.

* * * * *